(12) United States Patent
Joseph et al.

(10) Patent No.: US 6,423,261 B1
(45) Date of Patent: Jul. 23, 2002

(54) BLOWN FILM EXTRUSION APPARATUS AND METHOD WITH IMPROVED COLLAPSING FRAME

(76) Inventors: Daniel R. Joseph, 2125 S. Great SW. Pkwy. #101, Grand Prairie, TX (US) 75051; Ulrich Buttel, Schramperweg 18, Oldemburg (DE), 26129

( * ) Notice: Subject to any disclaimer, the term of this patent is extended or adjusted under 35 U.S.C. 154(b) by 0 days.

(21) Appl. No.: 09/243,205

(22) Filed: Feb. 2, 1999

(51) Int. Cl.$^7$ .............................................. B29C 47/92
(52) U.S. Cl. ...................... 264/407; 264/564; 264/40.3; 425/72.1; 425/141; 425/150; 425/326.1
(58) Field of Search ................................ 425/72.1, 141, 425/150, 326.1, 387.1, 392, 403.1; 264/564, 40.1, 40.3, 407

(56) References Cited

U.S. PATENT DOCUMENTS

| | | | |
|---|---|---|---|
| 3,355,770 A | * 12/1967 | Augustin | 18/14 |
| 4,650,406 A | * 3/1987 | Peters | 425/72 R |
| 5,104,593 A | * 4/1992 | Joseph | 264/23 |
| 5,352,393 A | * 10/1994 | Joseph | 264/23 |
| 5,437,544 A | * 8/1995 | Achelpohl | 425/72.1 |
| 5,525,277 A | * 6/1996 | Joseph | 264/40.6 |
| 5,891,383 A | * 4/1999 | Joseph | 264/407 |

OTHER PUBLICATIONS

Harris Instrument Corporation web page; http://www.harris-instrument.com/; 1995.*

British Plastics and Rubber On–Line web page; http://www.polymer-age.co.uk/k98/kextrude.htm.*

* cited by examiner

*Primary Examiner*—Robert Davis
*Assistant Examiner*—Joseph S Del Sole
(74) *Attorney, Agent, or Firm*—Melvin A. Hunn

(57) ABSTRACT

A blown film extrusion apparatus and method is provided including a tube position transducer transmits interrogating pulses to the extruded film tube and produces a position signal corresponding to a detected position under the extruded film tube. A bubble position control system is provided for receiving and processing the position signal. The apparatus further includes a collapsing frame assembly for receiving the extruded film tube and collapsing it. A position transducer is provided for detecting the position of at least one of the frame boards. At least one board position actuator is provided for adjusting the position of at least one of the boards. A board control system is provided for receiving the board position information from the board position transducer and for providing control signals to the board position actuator to maintain at least one of the boards in a predetermined position.

13 Claims, 16 Drawing Sheets

BLOWN FILM EXTRUSION APPARATUS AND METHOD WITH IMPROVED COLLAPSING FRAME

BACKGROUND OF THE INVENTION

1. Field of the Invention

The present invention relates in general to blown film extrusion lines, and specifically to collapsing frames for use in blown film extrusion lines.

2. Description of the Prior Art

Blown film extrusion lines are utilized to produce plastic products, such as plastic bags and plastic sheets. While the output of these blown film-extrusion lines is relatively inexpensive material, the lines are expensive to purchase and expensive to operate. Typically, blown film extrusion lines produce large quantities of product. The costs associated with down time of the blown film extrusion line can amount to thousands of dollars per hour. The same is true for extrusion lines which produce product which is out of specification. Typically, the product which is generated by blown film extrusion lines must satisfy some fairly tight constraints. The diameter of the product should be uniform and the thickness of the product should be uniform. There are numerous prior art references which teach systems for gaging and controlling the circumference of an extruded film tube, including several prior art references which are commonly owned by Applicant. However, there has been very little effort in the prior art to better control the operation of the collapsing frames which serve to collapse the extruded film tube and flatten it. The present invention is directed to better control of the collapsing frame.

SUMMARY OF THE INVENTION

It is one objective of the present invention to provide an improved extruded film apparatus which includes a control mechanism for gaging and controlling the diameter of the extruded film tube, and a control mechanism for controlling the position of the boards which are present in the collapsing frame and which serve to collapse and flatten the extruded film tube before it is fed to rollers for further processing.

It is another objective of the present invention to provide a control system for the collapsing frame of an extruded film tube apparatus, wherein the boards associated with the collapsing frame have their position monitored by a non-contact ultrasonic transducer which determines whether the boards are either too far in or too far out relative to a predetermined set position. The invention further includes actuators for moving the boards associated with the collapsing frame either inward or outward in response to the position as determined by the position sensors.

These and other objectives are achieved as is now described. The present invention is directed to an improved blown film extrusion apparatus. An annular die is provided for extruding a film tube. At least one tube position transducer is located adjacent the extruded film tube for transmitting interrogating pulses to the extruded film tube and for producing a position signal corresponding to a detected position of the extruded film tube. A bubble position control system is provided for receiving and processing the position signal. A means is provided for varying the quantity of air within the extruded film tube in response to the bubble position and control means for for urging the extruded film tube to a desired position. A collapsing frame assembly is provided for receiving the extruded film tube and collapsing the extruded film tube. The collapsing frame assembly includes a plurality of frame boards. It further includes at least one board position transducer for detecting the position of at least one of the plurality of frame boards. The collapsing frame assembly further includes at least one board position actuator for adjusting the position of at least one of the plurality of frame boards. A board control system is provided for receiving board position information from the board position transducer and for passing control signals to the board position actuator to maintain at least one of the plurality of frame boards in a predetermined position.

The above as well as additional objectives, features, and advantages will become apparent in the following description.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of the preferred embodiment when read in conjunction with the accompanying drawings, wherein:

DETAILED DESCRIPTION OF THE INVENTION

Figure 1:
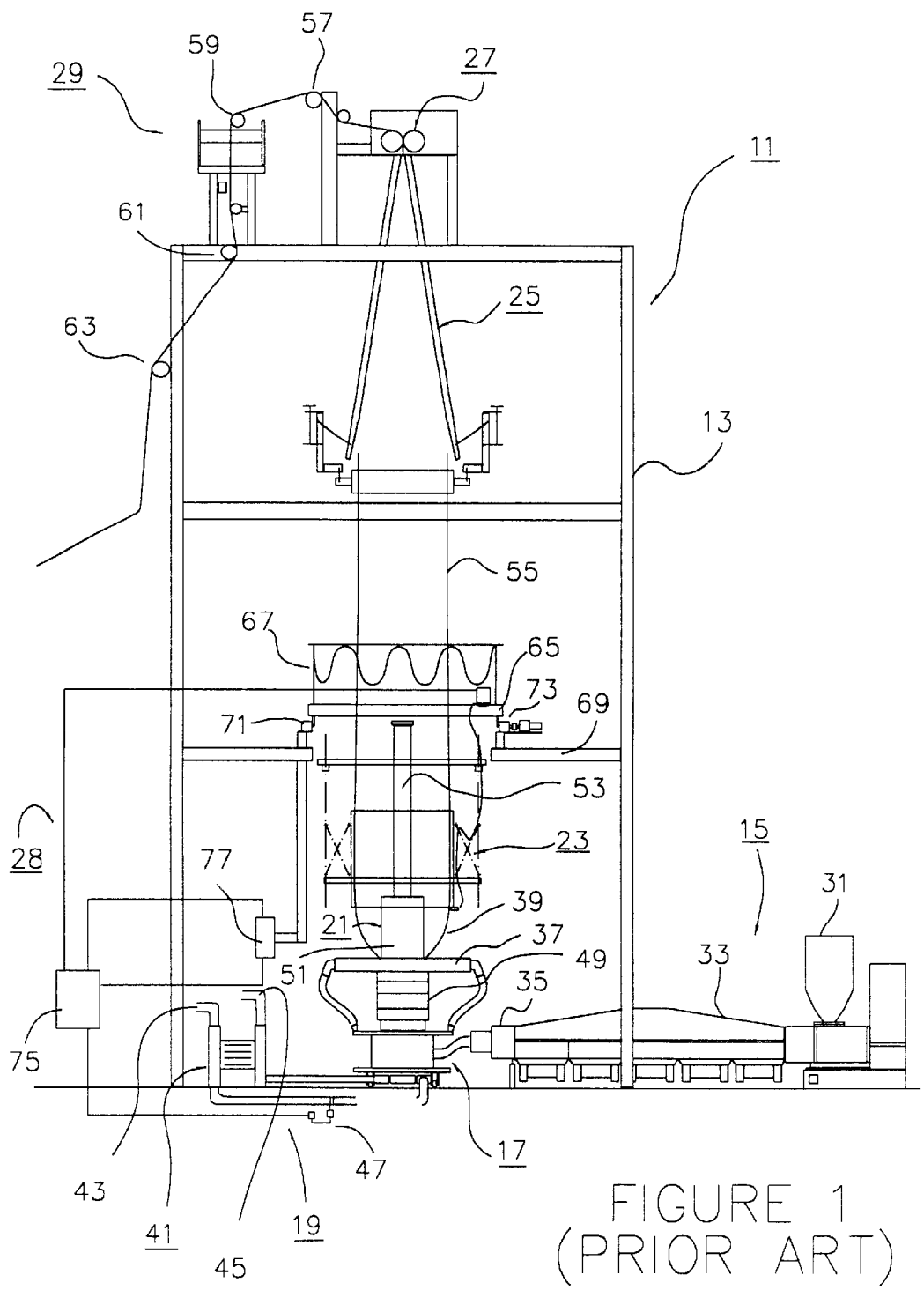
FIG. 1 is a view of a blown film extrusion line equipped with the improved control. system of the present invention.

FIG. 1 is a view of blown film extrusion line 11, which includes a number of subassemblies which cooperate to produce plastic bags and the like from plastic resin. The main components include blown film tower 13, which provides a rigid structure for mounting and aligning the various subassemblies, extruder subassembly 15, die subassembly 17, blower subassembly 19, stack 21, sizing cage 23, collapsible frame 25, nips 27, control subassembly 28 and rollers 29.

Plastic granules are fed into hopper 31 of extruder subassembly 15. The plastic granules are melted and fed by extruder 33 and pushed into die subassembly 17, and specifically to annular die 37. The molten plastic granules emerge from annular die 37 as a molten plastic tube 39, which expands from the die diameter to a desired final diameter, which may vary typically between two to three times the die diameter.

Blower subassembly 19 includes a variety of components which cooperate together to provide a flow of cooling air to the interior of molten plastic tube 39, and also along the outer periphery of molten plastic tube 39. Blower subassembly includes blower 41 which pulls air into the system at intake 43, and exhausts air from the system at exhaust 45. The flow of air into molten plastic tube 39 is controlled at valve 47. Air is also directed along the exterior of molten plastic tube from external air ring 49, which is concentric to annular die 37. Air is supplied to the interior of molten plastic tube 39 through internal air diffuser 51. Air is pulled from the interior of molten plastic tube 39 by exhaust stack 53.

The streams of external and internal cooling airs serve to harden molten plastic tube 39 a short distance from annular die 37. The line of demarcation between the molten plastic tube 39 and the hardened plastic tube 55 is identified in the trade as the "frost line." Normally, the frost line is substantially at or about the location at which the molten plastic tube 39 is expanded to the desired final diameter.

Adjustable sizing cage 23 is provided directly above annular die 37 and serves to protect and guide the plastic tube 55 as it is drawn upward through collapsible frame 25 by nips 27. Afterwards, plastic tube 55 is directed through a series of rollers 57, 59, 61, and 63 which serve to guide the tube to packaging or other processing equipment.

In some systems, rotating frame 65 is provided for rotating relative to blown film tower 13. It is particularly useful in rotating mechanical feeler arms of the prior art systems around plastic tube 55 to distribute the deformations. Umbilical cord 67 is provided to allow electrical conductors to be routed to rotating frame 65. Rotating frame 65 rotates at bearings 71, 73 relative to stationary frame 69.

Control subassembly 28 is provided to monitor and control the extrusion process, and in particular the circumference of plastic tube 55. Control subassembly 28 includes supervisory control unit, and operator control panel 77.

Figure 2:
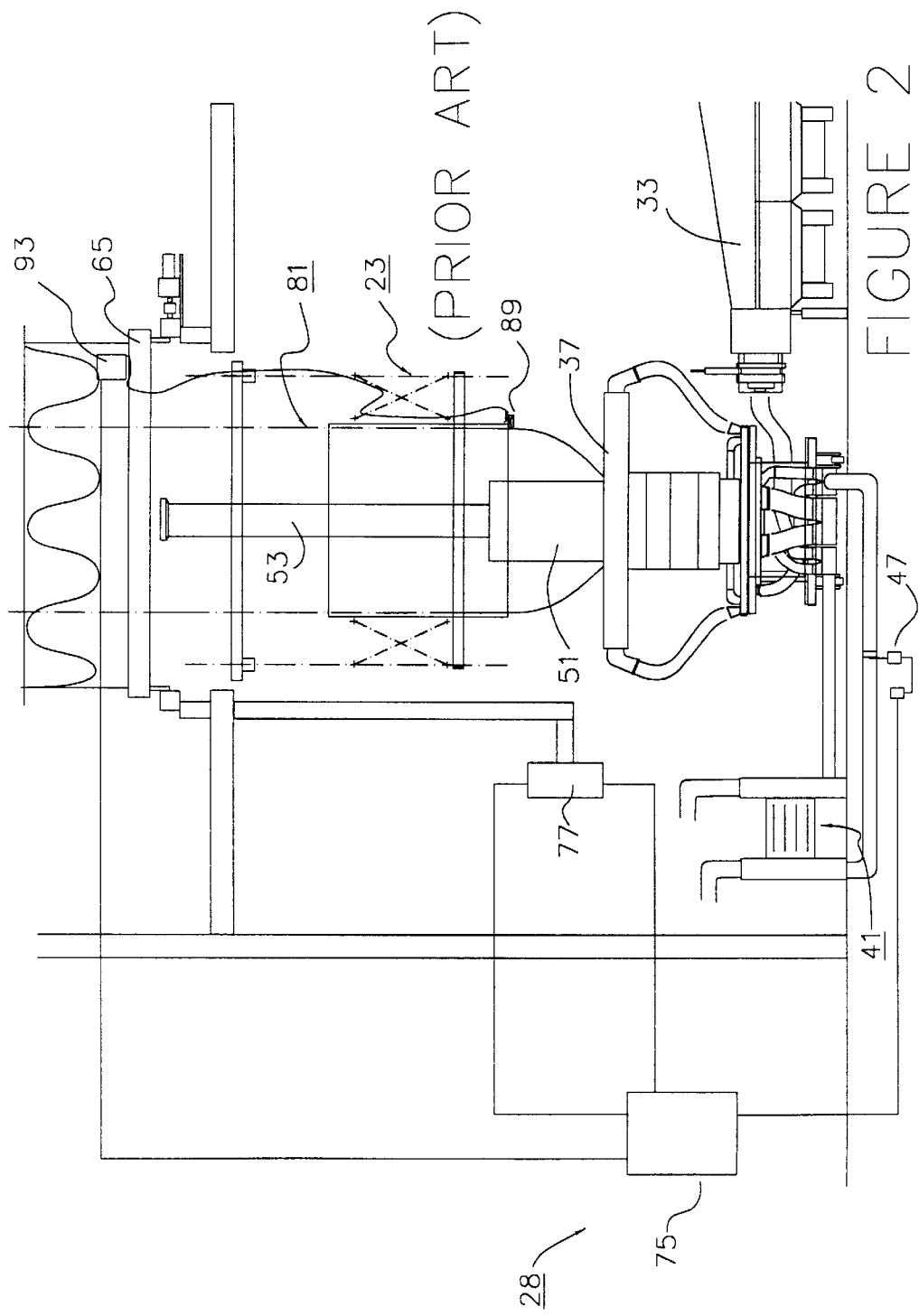
FIG. 2 is a view of the die, sizing cage, control subassembly and rotating frame of the blown film tower of FIG. 1.

FIG. 2 is a more detailed view of annular die 37, sizing cage 23, control 22 subassembly 28, and rotating frame 65. As shown in FIG. 2, supervisory control unit 75 is electrically coupled to operator control panel 77, valve 47, and ultrasonic sensor 89. These components cooperate to control the volume of air contained within extruded film tube 81, and hence the thickness and diameter of the extruded film tube 81. Valve 47 controls the amount of air directed by blower 41 into extruded film tube 81 through internal air diffuser 51.

If more air is directed into extruded film tube 81 by internal air diffuser 51 than is exhausted from extruded film tube 81 by exhaust stack 53, the circumference of extruded film tube 81 will be increased. Conversely, if more air is exhausted from the interior of extruded film tube 81 by exhaust stack 53 than is inputted into extruded film tube 81 by internal air diffuser 51, the circumference of extruded film tube 81 will decrease.

In the preferred embodiment, valve 47 is responsive to supervisory control unit 75 for increasing or decreasing the flow of air into extruded film tube 81. Operator control panel 77 serves to allow the operator to select the diameter of extruded film tube 81. Acoustic transducer 79 serves to generate a signal corresponding to the circumference of extruded film tube 81, and direct this signal to supervisory control unit 75 for comparison to the circumference setting selected by the operator at operator control panel 77.

If the actual circumference of extruded film tube 81 exceeds the selected circumference, supervisory control unit 75 operates valve 47 to restrict the passage of air from blower 41 into extruded film tube 81. This results in a decrease in circumference of extruded film tube 81. Conversely, if the circumference of extruded film tube 81 is less than the selected circumference, supervisory control unit 75 operates on valve 47 to increase the flow of air into extruded film tube 81 and increase its circumference. Of course, extruded film tube 81 will fluctuate in circumference, requiring constant adjustment and readjustment of the inflow of air by operation of supervisory control unit 75 and valve 47.

Figure 3:
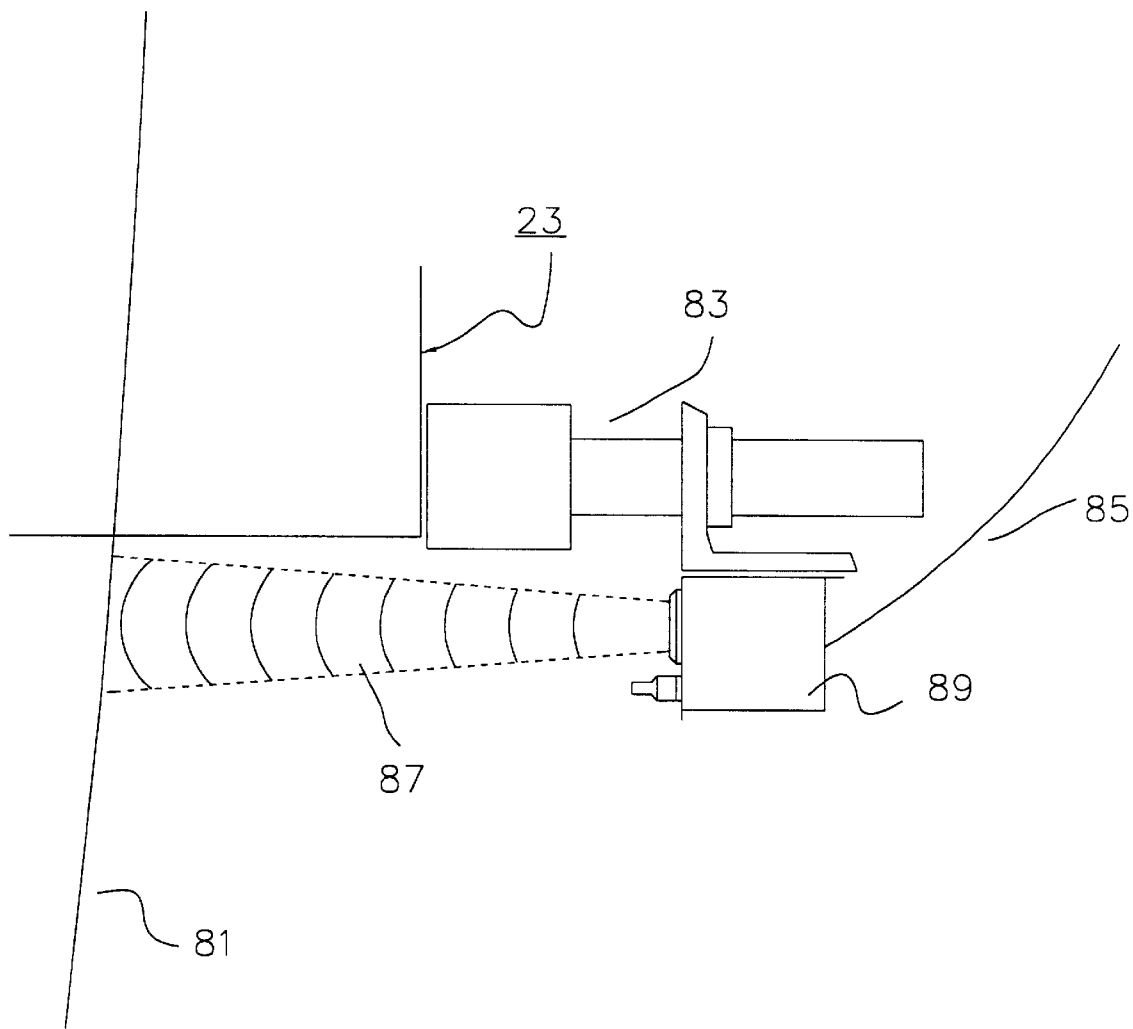
FIG. 3 is a view of the acoustic transducer of the improved control system of the present invention coupled to the sizing cage of the blown film extrusion line tower adjacent the extruded film tube of FIGS. 1 and 2.

FIG. 3 is a view of ultrasonic sensor 89 of the improved control system of the present invention coupled to sizing cage 23 adjacent extruded film tube 81. In the preferred embodiment, acoustic transducer 79 comprises an ultrasonic measuring and control system manufactured by Massa Products Corporation of Hingham, Mass., Model Nos. M-4000, M410/215, and M450, including a Massa Products ultrasonic sensor 89. It is an ultrasonic ranging and detection device which utilizes high frequency sound waves which are deflected off objects and detected. In the preferred embodiment, a pair of ultrasonic sensors 89 are used, one to transmit sonic pulses, and another to receive sonic pulses. For purposes of simplifying the description only one ultrasonic sensor 89 is shown, and in fact a single ultrasonic sensor can be used, first to transmit a sonic pulse and then to receive the return in an alternating fashion. The elapsed time between an ultrasonic pulse being transmitted and a significant echo being received corresponds to the distance between ultrasonic sensor 89 and the object being sensed. Of course, the distance between the ultrasonic sensor 89 and extruded film tube 81 corresponds to the circumference of extruded film tube 81. In the present situation, ultrasonic sensor 89 emits an interrogating ultrasonic beam 87 substantially normal to extruded film tube 81 and which is deflected from the outer surface of extruded film tube 81 and sensed by ultrasonic sensor 89.

The Massa Products Corporation ultrasonic measurement and control system includes system electronics which utilize the duration of time between transmission and reception to produce a useable electrical output such as a voltage or current. In the preferred embodiment, ultrasonic sensor 89 is coupled to sizing cage 23 at adjustable coupling 83. In the preferred embodiment, ultrasonic sensor 89 is positioned within seven inches of extruded film tube 81 to minimize the impact of ambient noise on a control system. Ultrasonic sensor 89 is positioned so that interrogating ultrasonic beam 87 travels through a path which is substantially normal to the outer surface of extruded film tube 81, to maximize the return signal to ultrasonic sensor 89.

Figure 4:
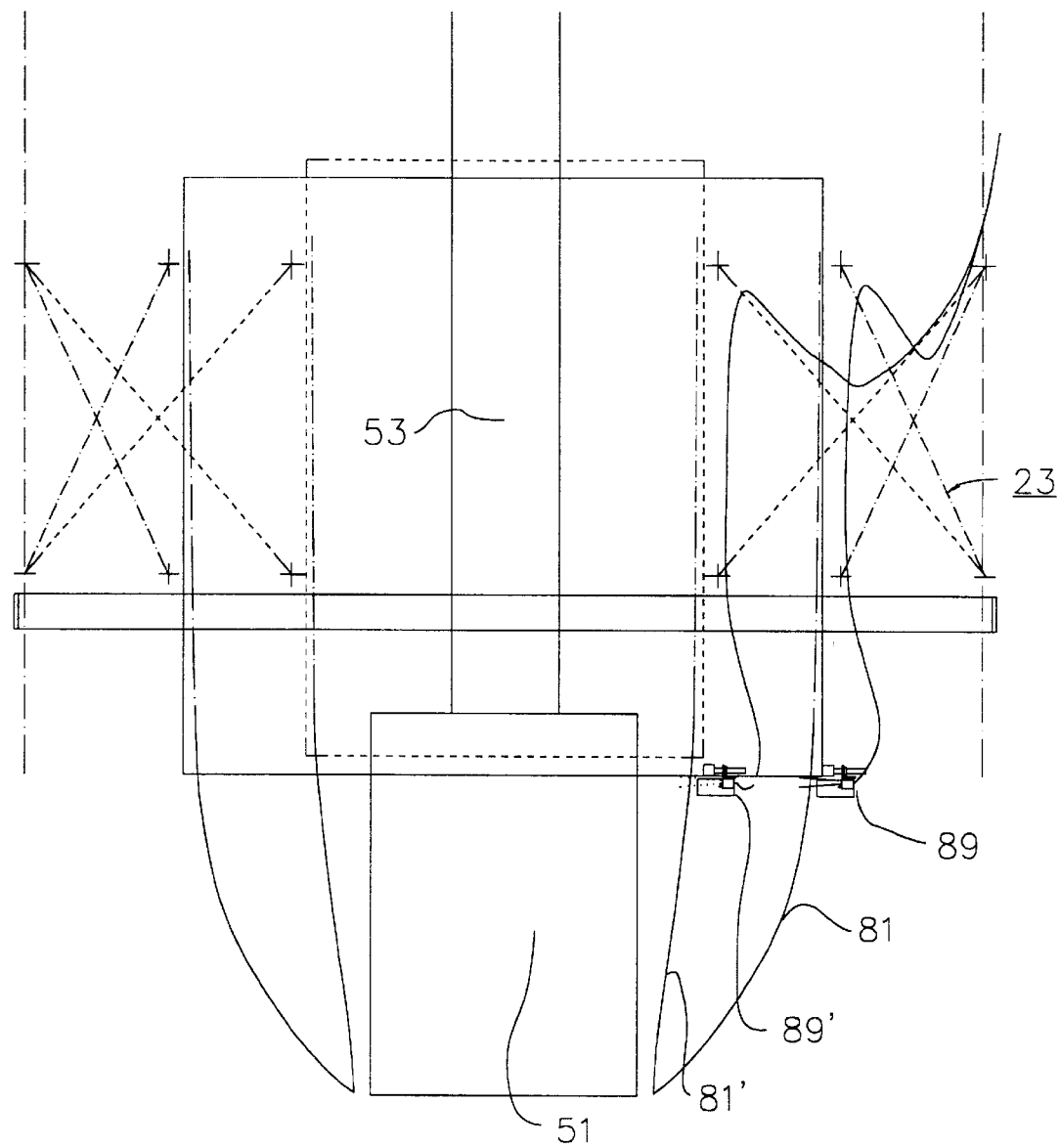
FIG. 4 is a view of the acoustic transducer of FIG. 3 coupled to the sizing cage of the blown film tower, in two positions, one position being shown in phantom.

FIG. 4 is a view of ultrasonic sensor 89 of FIG. 3 coupled to sizing cage 23 of the blown film tower 13, in two positions, one position being shown in phantom. In the first position, ultrasonic sensor 89 is shown adjacent extruded film tube 81 of a selected circumference. When extruded film tube 81 is downsized to a tube having a smaller circumference, ultrasonic sensor 89 will move inward and outward relative to the central axis of the adjustable sizing cage, along with the adjustable sizing cage 23. The second position is shown in phantom with ultrasonic sensor 89' shown adjacent extruded film tube 81' of a smaller circumference. For purposes of reference, internal air diffuser 51 and exhaust stack 53 are shown in FIG. 4. The sizing cage is also movable upward and downward, so ultrasonic sensor 89 is also movable upward and downward relative to the frostline of the extruded film tube 81.

Figure 5:
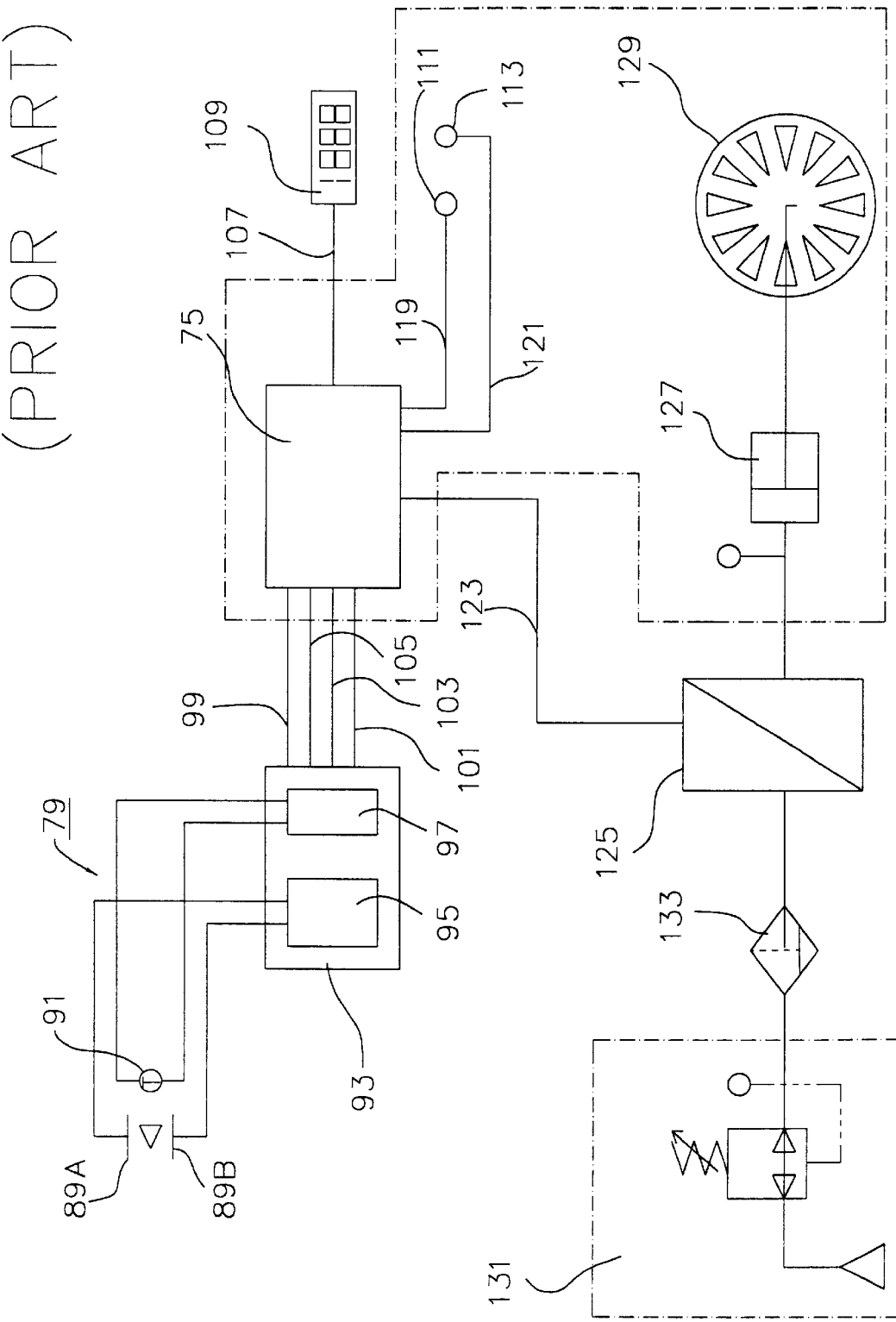
FIG. 5 is a schematic and block diagram view of the preferred control system of the present invention.

FIG. 5 is a schematic and block diagram view of the preferred control system of the present invention. The preferred acoustic transducer 79 of the present invention includes ultrasonic sensor 89 and temperature sensor 91 which cooperate to produce a current position signal which is independent of the ambient temperature. Ultrasonic sensor 89 is electrically coupled to ultrasonic electronics module 95, and temperature sensor 91 is electrically coupled to temperature electronics module 97. Together, ultrasonic electronics module 95 and temperature electronics module 97 comprise transducer electronics 93. Four signals are produced by acoustic transducer 79, including one analog signal, and three digital signals.

As shown in FIG. 5, four conductors couple transducer electronics to supervisory control unit 75. Specifically, conductor 99 routes a 0 to 10 volts DC analog input to supervisory control unit 75. Conductors 101, 103, and 105 provide digital signals to supervisory control unit 75 which correspond to a target present signal, maximum override, and minimum override. These signals will be described below in greater detail.

Supervisory control unit 75 is electrically coupled to setpoint display 109 through analog display output 107. An analog signal between 0 and 10 volts DC is provided to setpoint display 109 which displays the selected distance between ultrasonic sensor 89 and extruded film tube 81. A distance is selected by the operator through distance selector 111. Target indicator 113, preferably a light, is provided to indicate that the target (extruded film tube 81) is in range. Distance selector 111 is electrically coupled to supervisory control unit 75 by distance setting conductor 119. Target indicator 113 is electrically coupled to supervisory control unit 75 through target present conductor 121.

Supervisory control unit 75 is also coupled via valve control conductor 123 to proportional valve 125. In the preferred embodiment, proportional valve 125 corresponds to valve 47 of FIG. 1, and is a pressure control component manufactured by Proportionair of McCordsville, Ind., Model No. BB1. Proportional valve 125 translates an analog DC voltage provided by supervisory control unit 75 into a corresponding pressure between 0.5 and 1.2 bar. Proportional valve 125 acts on rotary valve 129 through cylinder 127. Pressurized air is provided to proportional valve 125 from pressurized air supply 131 through 20 micron filter 133.

Figure 6:
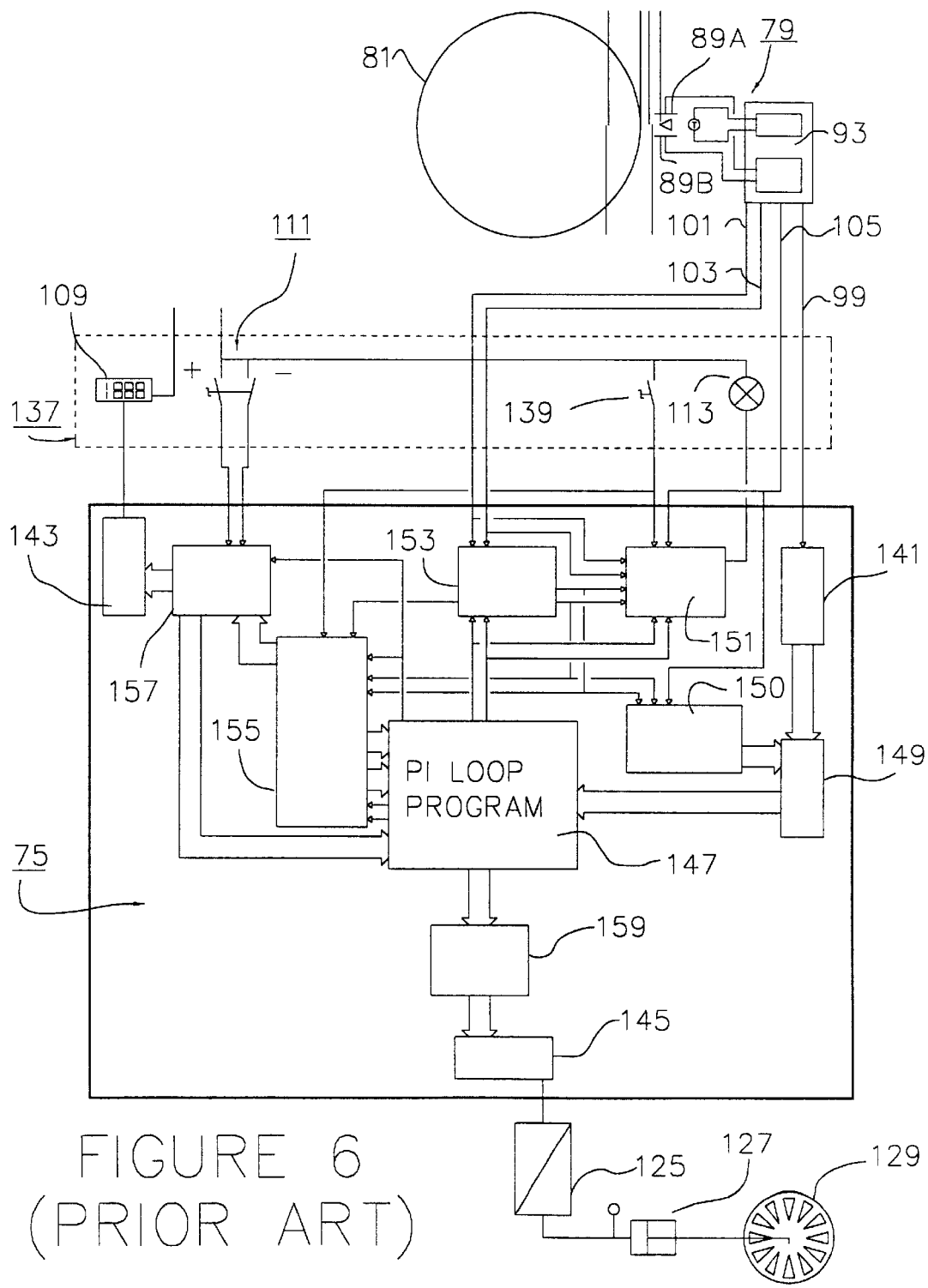
FIG. 6 is a schematic and block diagram view of the preferred control system of FIG. 5, with special emphasis on the supervisory control unit.

FIG. 6 is a schematic and block diagram view of the preferred control system of FIG. 5, with special emphasis on the supervisory control unit 75. Extruded film tube 81 is shown in cross-section with ultrasonic sensor 89 adjacent its outer wall. Ultrasonic sensor 89 emits interrogating pulses which are bounced off of extruded film tube and sensed by ultrasonic sensor 89. The time delay between transmission and reception of the interrogating pulse is processed by transducer electronics 93 to produce four outputs: CURRENT POSITION signal which is provided to supervisory control unit 75 via analog output conductor 99, digital TARGET PRESENT signal which is provided over digital output 105, a minimum override signal (MIO signal) indicative of a collapsing or undersized bubble which is provided over digital output conductor 103, and maximum override signal (MAO signal) indicative of an overblown extruded film tube 81 which is provided over a digital output conductor 101.

Figure 7:
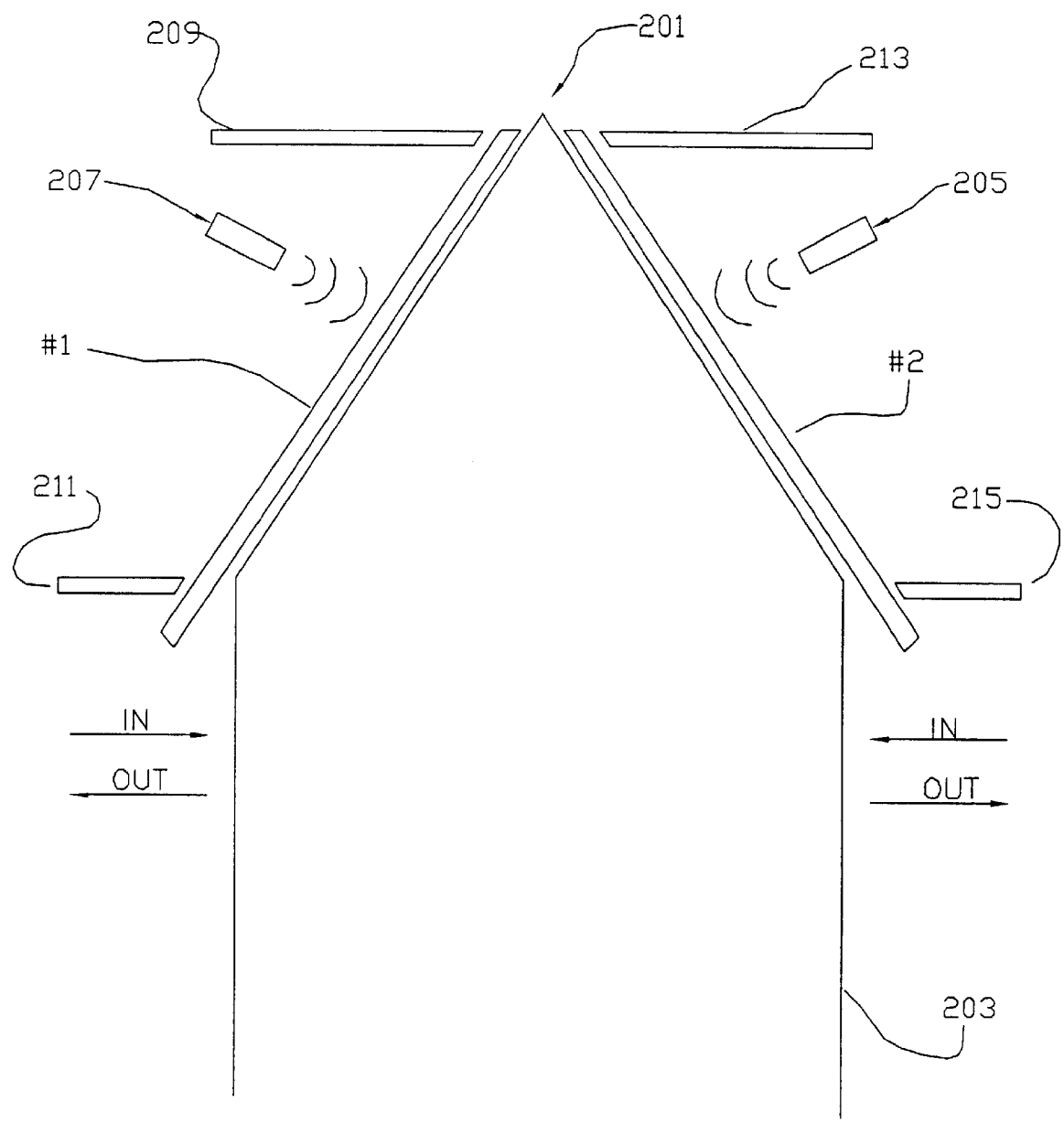
FIGS. 7 and 8 are simplified pictorial representations of an exemplary and highly over-controlled system for controlling position of the boards of a collapsing frame, all in accordance with the present invention, with FIG. 7 depicting control over main boards 1 and 2, and FIG. 8 depicting control of the side boards 3 and 4.

As shown in FIG. 6, the position of extruded film tube 81 relative to ultrasonic sensor 89 is analyzed and controlled with reference to a number of distance thresholds and setpoints, which are shown in greater detail in FIG. 7. All set points and thresholds represent distances from reference R. The control system of the present invention attempts to maintain extruded film tube 81 at a circumference which places the wall of extruded film tube 81 at a tangent to the line established by reference A. The distance between reference R and set point A may be selected by the user through distance selector 111. This allows the user to control the distance between ultrasonic sensor 89 and extruded film tube 81.

The operating range of acoustic transducer 79 is configurable by the user with settings made in transducer electronics 93. In the preferred embodiment, using the Massa Products transducer, the range of operation of acoustic transducer 79 is between 3 to 24 inches. Therefore, the user may select a minimum circumference threshold C and a maximum circumference threshold B, below and above which an error signal is generated. Minimum circumference threshold C may be set by the user at a distance d3 from reference R. Maximum circumference threshold B may be selected by the user to be a distance d2 from reference R. In the preferred embodiment, setpoint A is set a distance of 7 inches from reference R. Minimum circumference threshold C is set a distance of 10.8125 inches from reference R. Maximum circumference threshold B is set a distance of 4.1 inches from reference R. Transducer electronics 93 allows the user to set or adjust these distances at will provided they are established within the range of operation of acoustic transducer 79, which is between 3 and 24 inches.

Besides providing an analog indication of the distance between ultrasonic sensors 89 and extruded film tube 81, transducer electronics 93 also produces three digital signals which provide information pertaining to the position of extruded film tube 81. If extruded film tube 81 is substantially normal and within the operating range of ultrasonic sensor 89, a digital "1" is provided at digital output 105. The signal is representative of a TARGET PRESENT signal. If extruded film tube 81 is not within the operating range of ultrasonic sensor 89 or if a return pulse is not received due to curvature of extruded film tube 81, TARGET PRESENT signal of digital output 105 is low. As discussed above, digital output 103 is a minimum override signal MIO. If extruded film tube 81 is smaller in circumference than the reference established by threshold C, minimum override signal MIO of digital output 103 is high. Conversely, if circumference of extruded film tube 81 is greater than the reference established by threshold C, the minimum override signal MIO is low.

Digital output 101 is for a maximum override signal MAO. If extruded film tube 81 is greater than the reference established by threshold B, the maximum override signal MAO is high. Conversely, if the circumference of extruded film tube 81 is less than the reference established by threshold B, the output of maximum override signal MAO is low.

The minimum override signal MIO will stay high as long as extruded film tube 81 has a circumference less than that established by threshold C. Likewise, the maximum override signal MAO will remain high for as long as the circumference of extruded film tube 81 remains larger than the reference established by threshold B.

Threshold D and threshold E are also depicted in FIG. 7. Threshold D is established at a distance d4 from reference R. Threshold E is established at a distance d5 from reference R. Thresholds D and E are established by supervisory control unit 75, not by acoustic transducer 79. Threshold D represents a minimum circumference threshold for extruded film tube 81 which differs from that established by transducer electronics 93. Likewise, threshold E corresponds to a maximum circumference threshold which differs from that established by acoustic transducer 79. Thresholds D and E are established in the software of supervisory control unit 75, and provide a redundancy of control, and also minimize the possibility of user error, since these threshold are established in software, and cannot be easily changed or accidentally changed.

Additional and further details concerning the control system for controlling the circumference of an extruded film tube are set forth in U.S. Pat. No. 5,525,277, which is incorporated herein by reference, and which is commonly owned. The present invention provides additional controls not available in the prior art. In particular, the present invention allows additional control over the blown film apparatus by providing control over the collapsing frame which is adapted for receiving, collapsing, and flattening the extruded film tube. Greater accuracy and efficiency may be obtained in a blown film apparatus which provides control over both the circumference of the extruded film tube and the position of the collapsing frame. When these two are controlled in tandem, the results are superior than in prior art systems.

Figure 8:
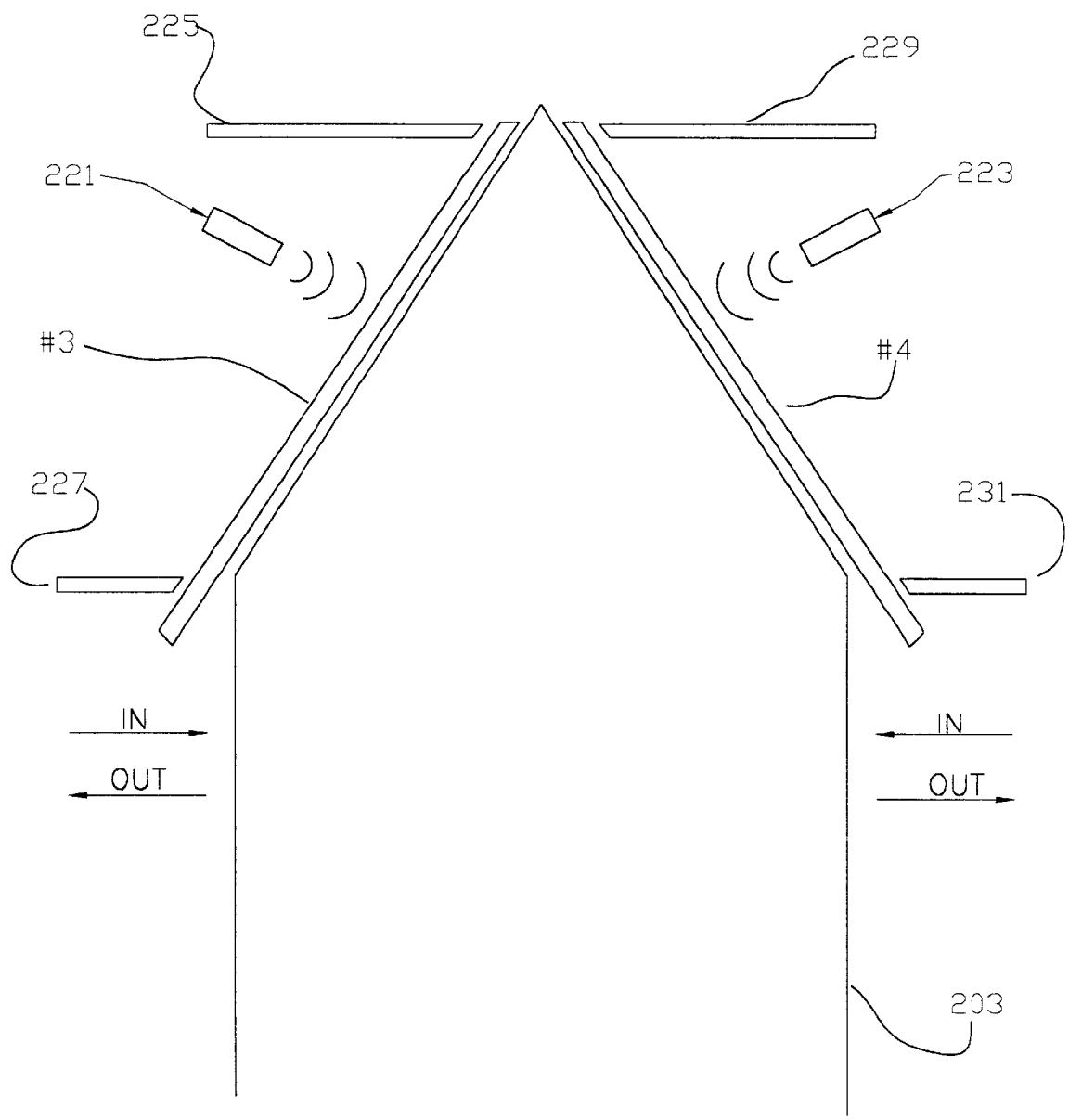

FIGS. 7 and 8 are simplified views of an exemplary, but highly over-controlled, embodiment of the present invention. FIG. 7 depicts the utilization of the present invention to determine the position of collapsing frame board numbers 1 and 2, and to adjust the position in order to obtain the production objective. FIG. 8 is a simplified depiction of utilization of the present invention to monitor the position of board numbers 3 and 4 of a collapsing frame assembly. Collapsing frame assemblies will typically include a plurality of boards, in pairs. For example, a collapsing frame may include opposing main boards which face one another, and opposing side boards which face one another. As is shown in FIGS. 7 and 8, the extruded film tube 203 extends upward into the collapsing frame assembly where it is collapsed and flattened. The example provided in FIGS. 7 and 8 is over controlled in that the position of each of these boards is individually monitored by a non-contact sensor. In the view of FIG. 7, non-contact sensors 205, 207 monitor the position of board numbers 1 and 2. Likewise in FIG. 8, non-contact sensors 221, 223 monitor the positions of board numbers 3 and 4. Since collapsing frame boards are paired, it is not necessary to monitor each board individually. In the alternative embodiment, only a single sensor is utilized to monitor one of the boards of each pair. It is preferable to monitor the boards since they are mechanically connected in a manner which makes them symmetrical in position. Knowledge about the position of one board is typically accurate for the other board. In the other embodiments of the present invention, two sensors may be utilized on a single board (such as, for example, board number 1) to monitor the position of the upper and lower ends of the board.

As is shown in FIG. 7, non-contact sensors 205, 207 are located adjacent board numbers 1 and 2 and are utilized to determine the position of the board, relative to a frame (not shown). Board 1 has associated with it actuators 209, 211, which are adapted to move the upper and lower ends of board number 1 inward and outward relative to the extruded film tube 203. Likewise, board number 2 has associated with it actuators 213, 215, which are utilized to move the upper and lower ends of board number 2 inward and outward relative to extruded film tube 203.

Likewise, in FIG. 8, sensors 221, 223 are utilized to monitor the position of board numbers 3 and 4. Board number 3 has associated with it actuators 225, 227, which are utilized to adjust the upper and lower portions of board number 3 inward and outward relative to extruded film tube 203. Likewise, board number 4 has associated with it actuators 229, 231, which are utilized to adjust the upper and lower portions of board number 4 relative to extruded film tube 203.

In accordance with the present invention, the actuators will comprise electrically-actuable motors which can be utilized to relocate the boards. When all the actuators are utilized, the main boards and side boards can be adjusted in their location relative to the extruded film tube. This allows the collapsing frame to be easily adjusted in order to track (or correspond to) the diameter of the extruded film tube which is being produced by the extruded film tube apparatus.

Figure 9:
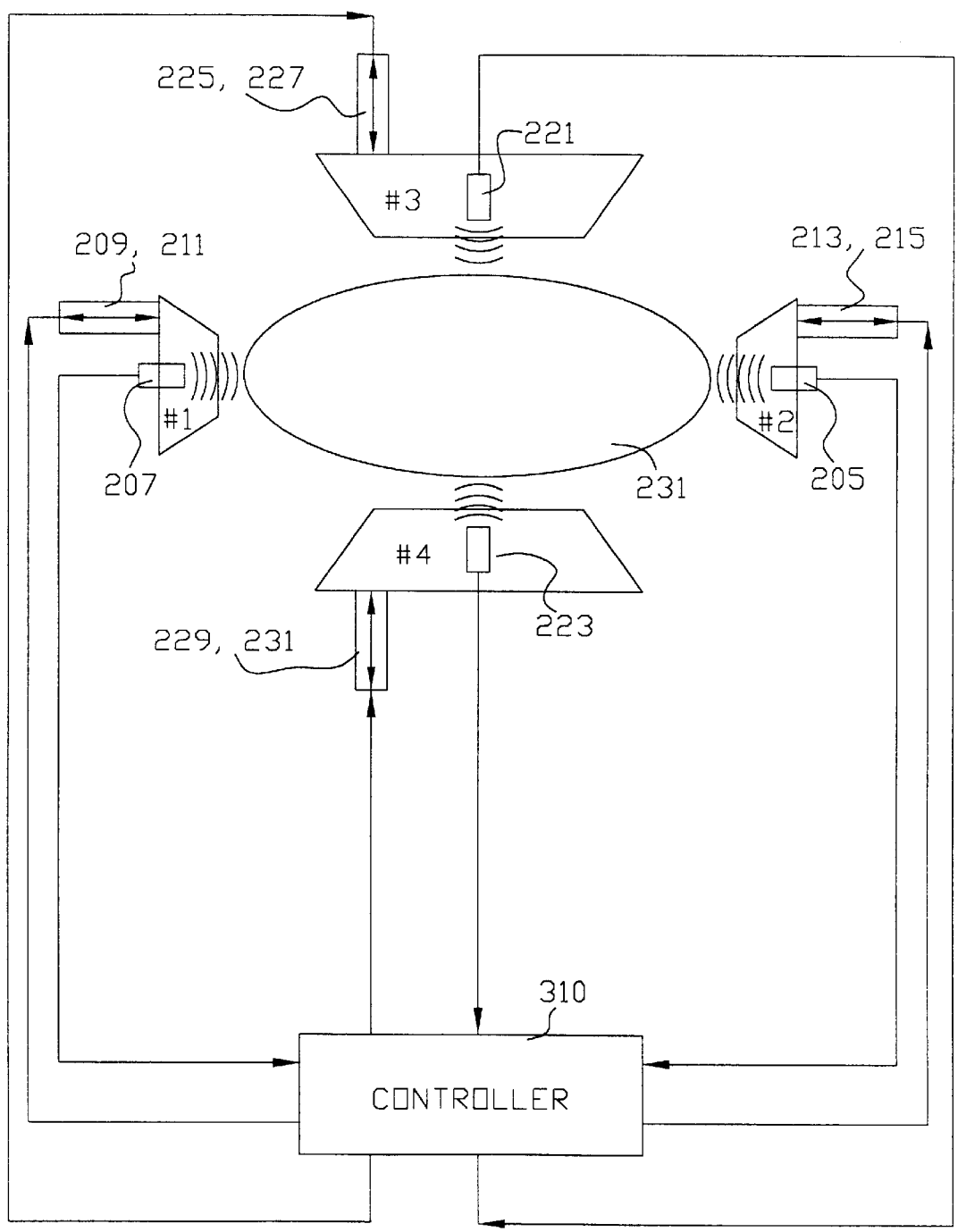
FIG. 9 is a simplified block diagram representation of control obtained in accordance with the present invention over the boards of a collapsing frame, again in an exemplary and highly over-controlled embodiment.

FIG. 9 is a simplified block diagram view which represents the exemplary (and over-controlled) embodiment of FIGS. 7 and 8. As is shown, extruded film tube 231 is surrounded by boards 1 through 4 of the collapsing frame. As is shown, board number 1 may be moved inward and outward relative to extruded film tube 231 through actuators 209, 211. The position of board number 1 is determined by non-contact sensor 207. The sensor data is provided to controller 310, and controller 310 provides control signals to actuators 209, 211. Likewise, the position of board number 2 is determined by non-contact sensor 205. This position data is provided to controller 310. Controller 310 provides command signals to actuators 213, 215 which move board number 2 inward and outward relative to extruded film tube 231. Similarly, the position of board number 3 is determined by non-contact sensor 221. The signal is provided at controller 310. Controller 310 provides control signals to actuators 225, 227 to move board number 3 inward or outward relative to extruded film tube 231. Likewise, the position of board number 4 is determined by non-contact sensor 223. This information is provided to controller 310. Controller 310 provides control signals to actuators 229, 231 to move board number 4 inward and outward relative to extruded film tube 231.

Figure 10:
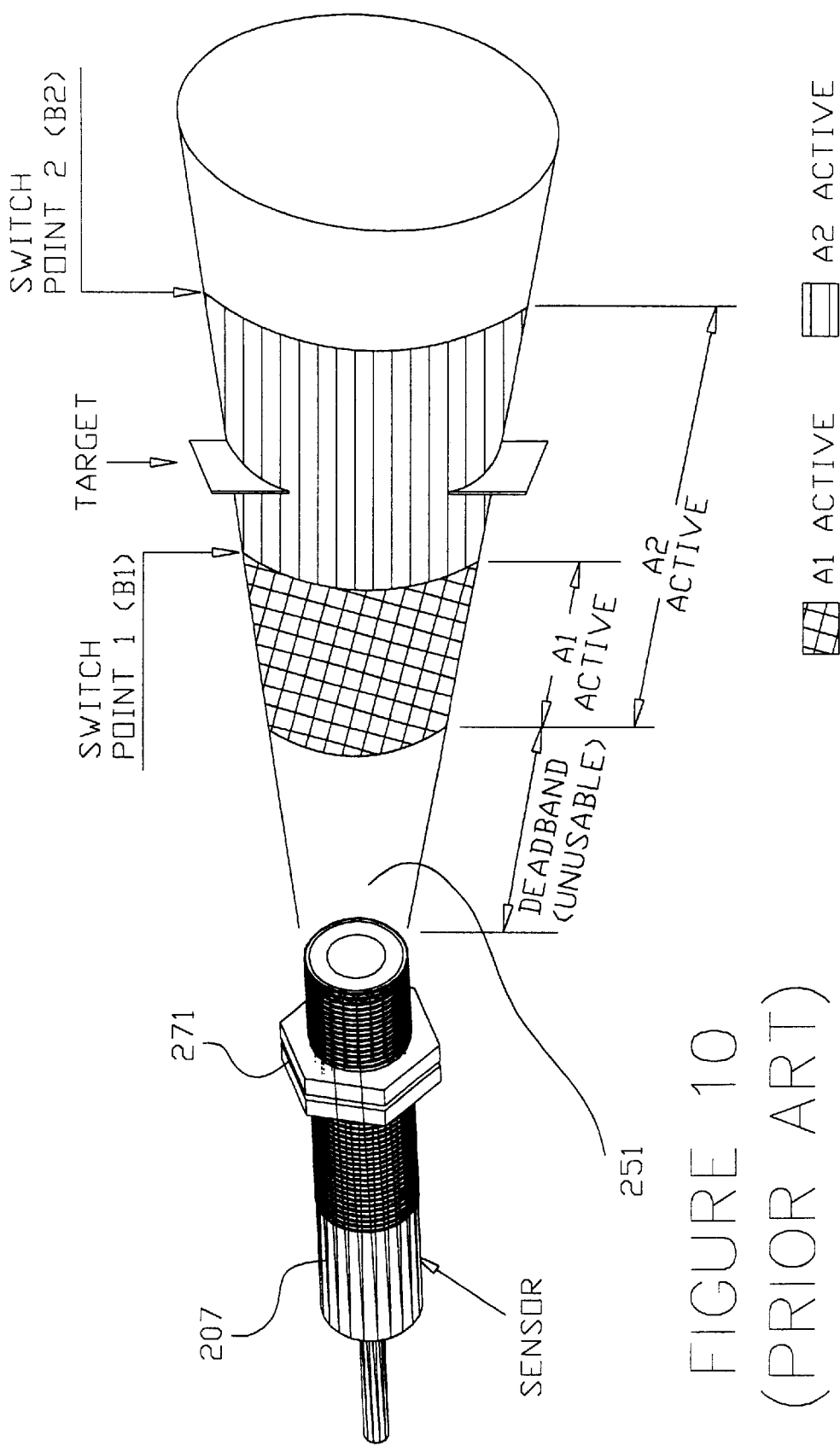
FIG. 10 is a pictorial representation of the non-contact sensor utilized in accordance with the preferred embodiment of the present invention for determining and controlling the position of boards of a collapsing frame.

In the preferred embodiment of the present invention, a non-contact ultrasonic sensor is utilized to determine the position of the various positions which are under control. In the preferred embodiment, an ultrasonic proximity sensor manufactured by Pepperl+Fuchs of Twinsburg, Ohio is utilized. This particular ultrasonic proximity sensor is a dual switch device. In a dual switch mode of operation, two independent switch points are monitored. This is depicted in FIG. 10. As is shown, non-contact sensor 207 includes a sensor housing 271 which includes external threads to facilitate coupling to a bracket assembly (not depicted). An ultrasonic beam 251 is generated. There are two active regions: active region A1 and active region A2. There are also two switch points: point B1 and point B2. If the target appears between the dead band end and nearest switch point B1, trigger A1 will be triggered. However, if the target appears between the dead band and the far switch point B2, trigger A2 will be triggered. Utilization of this non-contact ultrasonic sensor is ideal for the present application of determining the position of the boards of a collapsing frame.

In the preferred embodiment of the present invention, programmable relays are utilized to determine the control exercised by controller 310 over the collapsing frame assembly. In alternative embodiments, a microprocessor could be utilized, but in the present embodiment, program relays are utilized. Preferably a Direct Logic Model No. 205 programmable relay is utilized to receive and implement the control instructions. In the preferred embodiment of the present invention, one position sensor is used for each of the four boards (two main boards and the two side boards).

Figure 11A:
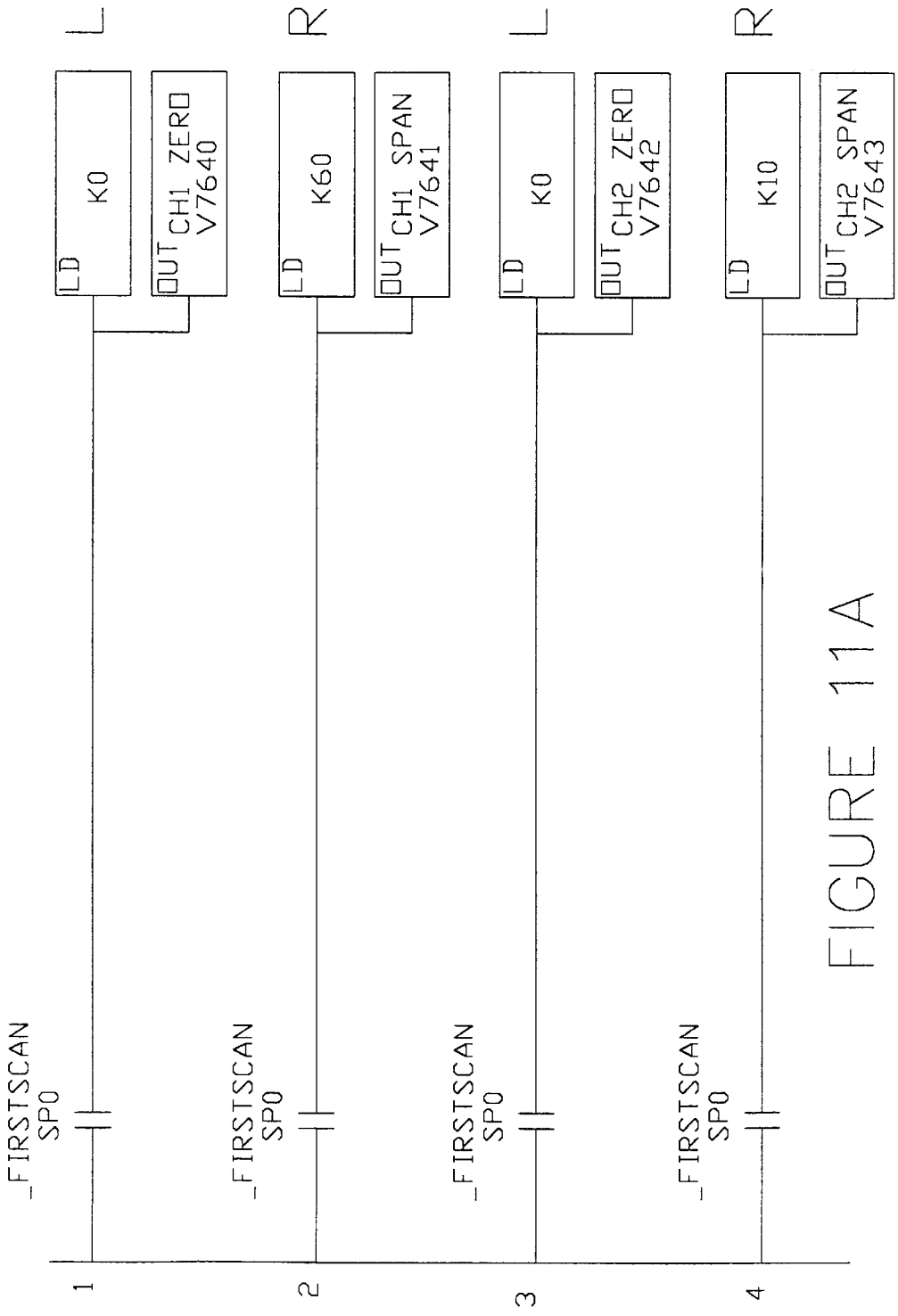
FIGS. 11A–11F are logic ladders which illustrate one particular embodiment of the present invention which utilizes programmable relays to accomplish control over the boards of the collapsing frame.

FIGS. 11A–11F represent relay ladder logic depictions of the logic employed to control the collapsing frame boards. As shown in FIG. 11A, ladder rungs 1 through 4 represent the loading of the values of potentiometers into the device. These represent on-delay and off-delay times for all four sensors. The use of on-delay and off-delay intervals prevents false alarms from occurring.

Figure 11B:
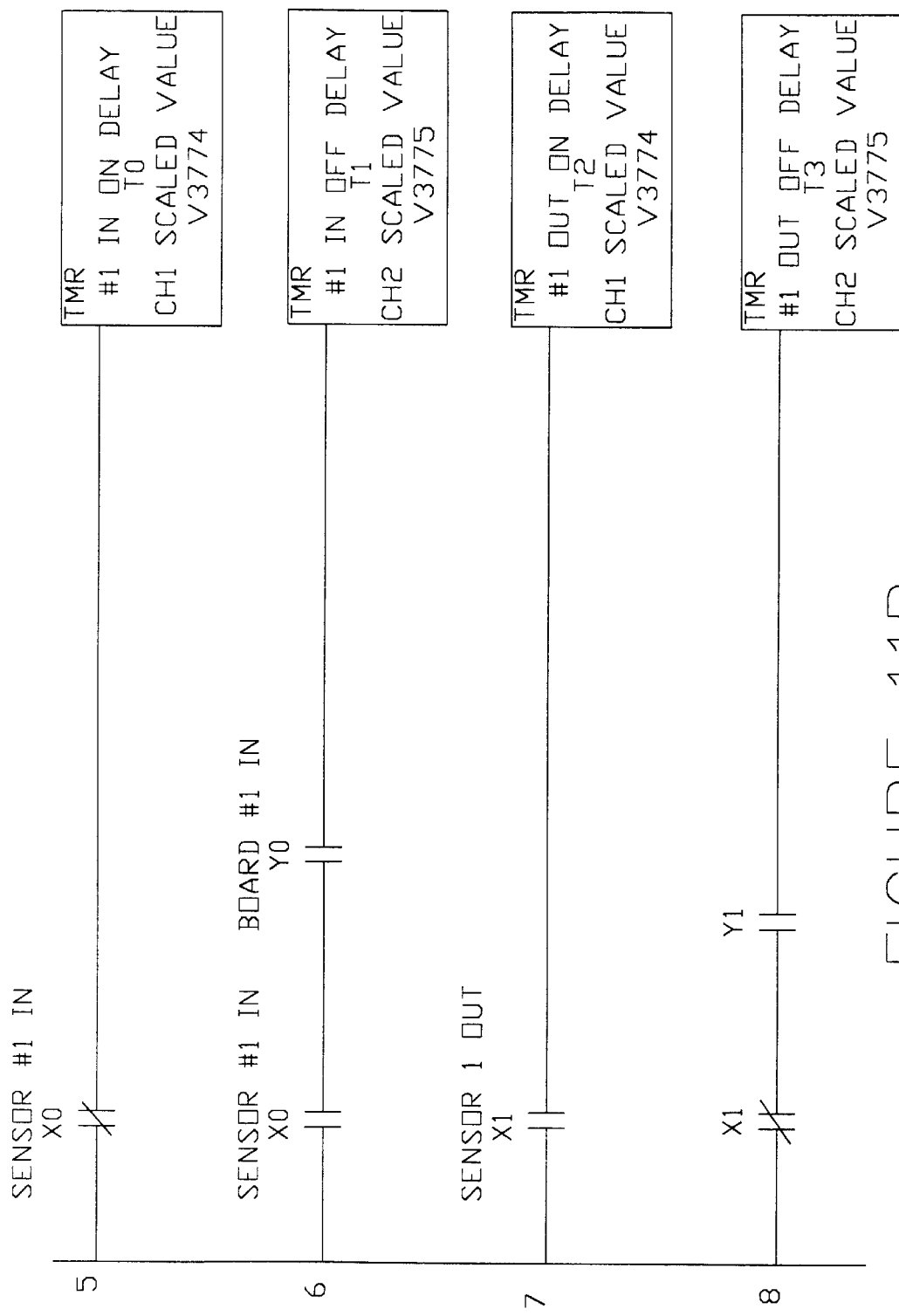

With reference to FIG. 11B, ladder rungs 5 through 8 represent various conditions for sensor number 1. Ladder rung number 5 represents the condition of sensor number 1 being "out too far" relative to the collapsing board. The logic of rung number 5 calls for the moving of the board associated with sensor number 1 inward since it is determined that the sensor is too far out relative to the board. Of course, the on-delay interval must pass before the movement occurs. Ladder rung number 6 represents the condition of sensor number 1 being "not too far out." This logic is implemented when sensor number 1 is determined to be not out too far, and board number 1 is still moving inward. Of course, the program off-delay avoids undesirable chatter.

Rung number 7 represents sensor number 1 being "in too far." This calls for the response of moving the associated board outward after the on-delay interval expires. Rung 8 corresponds to sensor number 1 being "not in too far." This corresponds to the sensor being in a "not in too far" condition while board number 1 is moving. The off-delay interval also must transpire before the board movement is shut off. This avoids undesirable chatter.

Figure 11C:
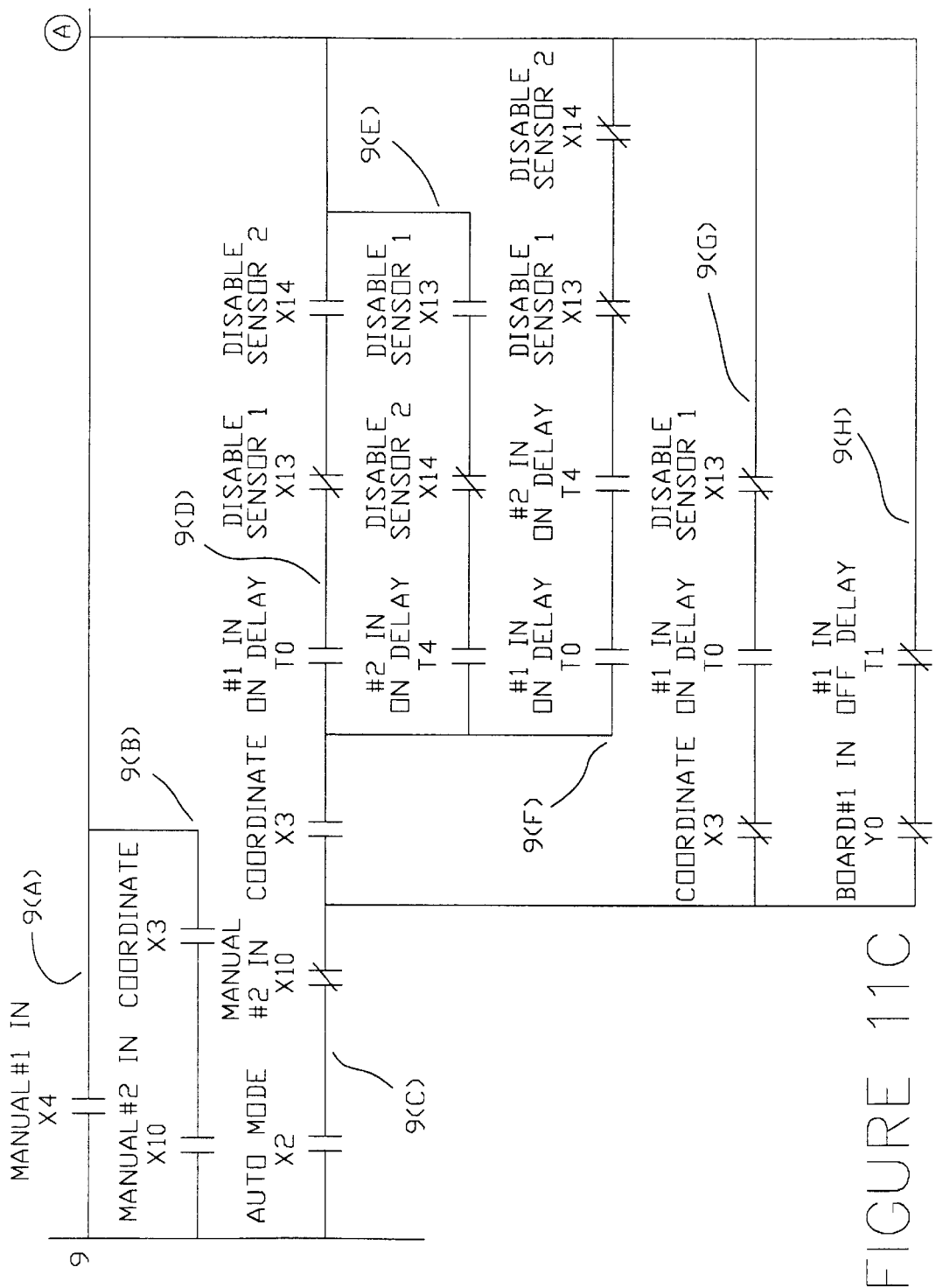

With reference to FIG. 11C, rung number 9 corresponds to a manual-on mode of operation. Rung 9(a) corresponds to the manual-on mode of operation. Rung 9(b) corresponds to a coordinated mode of operation. Rung 9(c) corresponds to a condition of being not in manual mode of operation. Subrung 9(d) corresponds to the condition of expiration of the on-delay interval, with sensor number 1 not being disabled, and sensor 2 being in a disabled condition. Subrung 9(e) corresponds to the on-delay interval not being expired, with sensor number 1 not disabled, and with sensor number 2 being disabled. Subrung 9(g) corresponds to the on-delay interval having been expired, and sensor number 1 being not disabled. Subrung 9(h) corresponds to board number 1 being moved inward, and the off-delay interval not yet being expired. All of the subrungs are ANDed with the logic of FIG. 11D which represents board number 1 not going outward. The result is set forth in subrung 9(i) FIG. 11D as driving board number 1 inward.

Figure 11D:
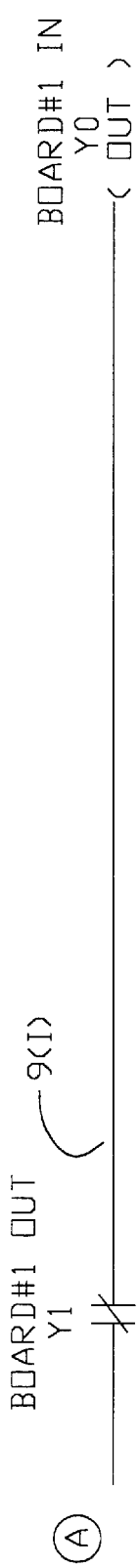
Figure 11E:
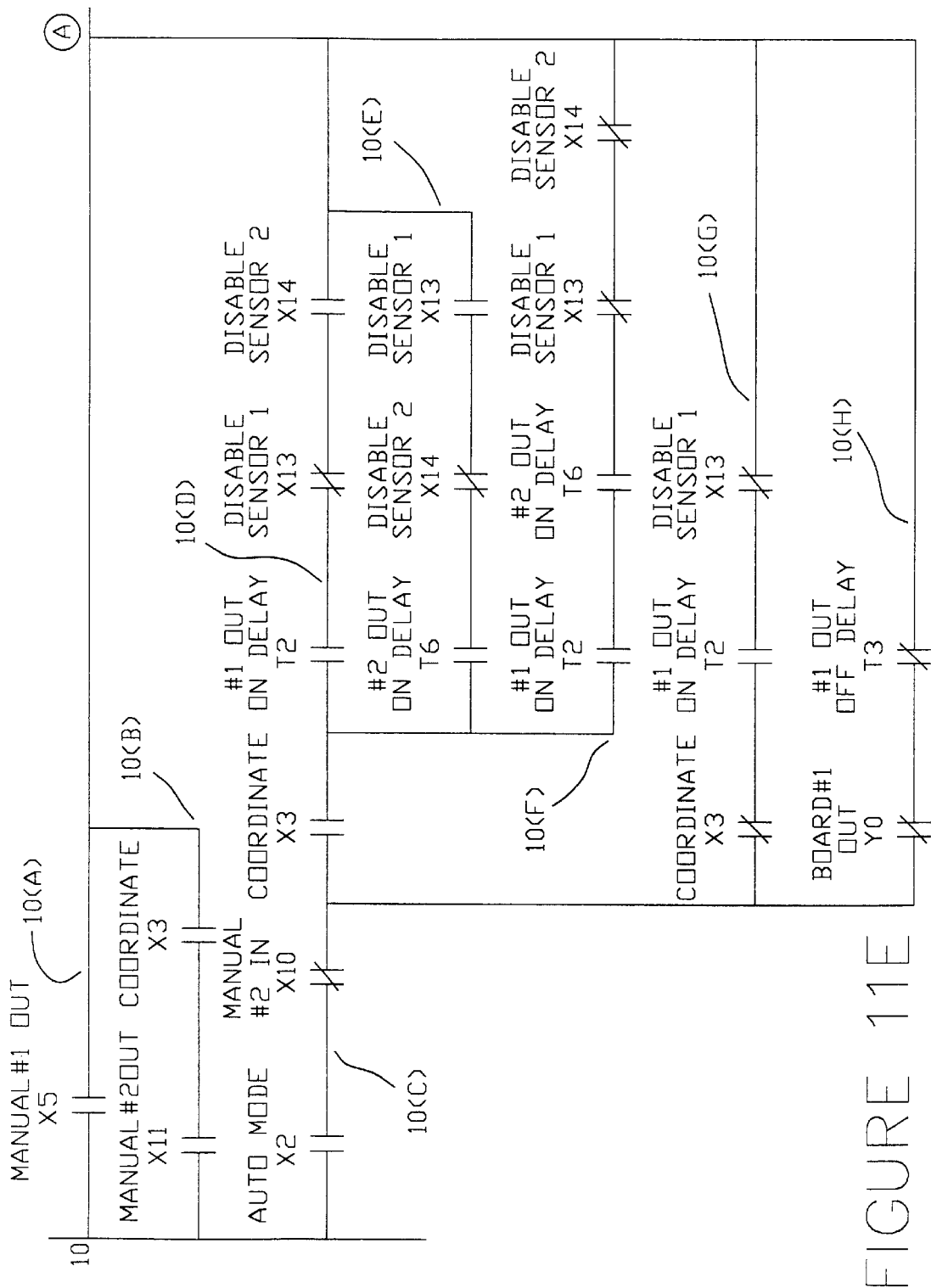
Figure 11F:
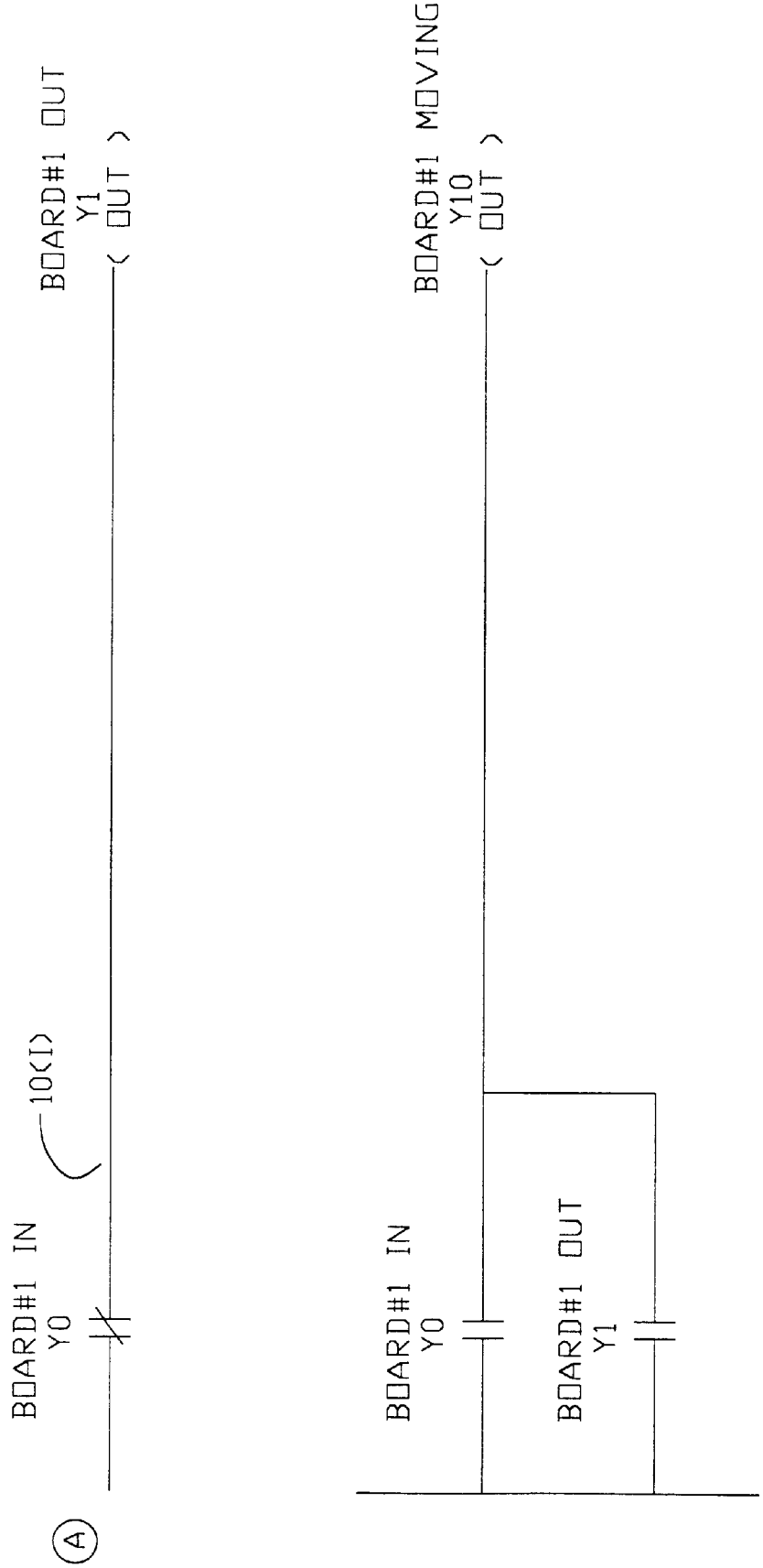

FIGS. 11E and 11F are similar to the ladder rungs of FIGS. 11E and 11D, but instead represent movement of the board outward. Subrung 10(a) corresponds to a manual-on mode of operation. Subrung 10(b) corresponds to a coordinated operation of opposing boards. Subrung 10(c) corresponds to an automatic mode of operation. Subrung 10(d) corresponds to the condition of expiration of the on-delay interval, with sensor number 1 not being disabled, and sensor 2 being in a disabled condition. Subrung 10(e) corresponds to the on-delay interval not being expired with sensor number 1 not disabled, and sensor number 2 being disabled. Subrung 10(g) corresponds to the on-delay interval having been expired, and sensor number 1 not being disabled. Subrung 10(h) corresponds to board number 1 being moved outward, and the off-delay interval not yet expired. All of the subrungs are ANDed with the logic of FIG. 11F. Subrung 10(i) which represents board number 1 not going inward. The result is set forth in FIG. 11F. Subrung 10(i), as driving board number 1 outward.

Identical logic is employed for each of the other boards under control of the relay control system. In this manner, each of the boards are maintained in a position determined by the ultrasonic sensor. The boards are moved inward and outward if necessary to meet particular production objectives. In general, the concept is to have the position and size of the boards to correspond generally to the diameter of the blown film tube, to enhance product uniformity. Accordingly, the frame will generally track the bubble size. The operations of the controller for the bubble diameter control and the collapsing frame control can result in enhanced operations and product uniformity. While the specification discusses the use of non-contact, ultrasonic transducers, it is possible to utilize mechanical switch devices which are affixed to the boards themselves. One example would be the utilization of tilt-indicators in order to determine the relative position of the boards. The ultrasonic transducer provides good control since it controls both inward and outward directions. The logic employed is relatively straightforward and low cost to implement.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended clams will cover any such modifications or embodiments that fall within the scope of the invention.

What is claimed is:

1. A method of producing blown film in a blown film extrusion apparatus, which includes:
   (i) an annular die for extruding a film tube;
   (ii) at least one sensor located adjacent said extruded film tube for transmitting interrogating pulses to said extruded film tube and for producing a position signal corresponding to a detected position of said extruded film tube;
   (iii) a bubble position control system for receiving and processing said position signal;
   (iv) means for varying a quantity of air within said extruded film tube in response to said bubble position control system for urging said extruded film tube to a desired position, including a controllable valve, a supply blower, and an exhaust blower;
   the method comprising the steps of:
   (a) providing a collapsing frame assembly for receiving said extruded film tube and collapsing said extruded film tube;
   (b) said collapsing frame assembly including:
      (1) a plurality of frame boards;
      (2) at least one board position transducer for detecting the position of at least one of said plurality of frame boards;

(3) at least one board position actuator for adjusting the position of at least one of said plurality of frame boards;

(4) a board control system for receiving board position information from said at least one board position transducer and for providing control signals to said at least one board position actuator to maintain at least one of said plurality of frame boards in a predetermined position;

(c) concurrently operating said bubble position control system and said board control system during blown film extrusion operations in order to produce blown film product of uniform diameter by utilization of said board control system of said collapsing frame assembly to receive position signals from said at least one board position actuator and to actuate said at least one board position actuator to position said plurality of frame boards in order to track a specific diameter of the extruded film tube which is being produced.

2. A method according to claim 1 wherein said board control system maintains said collapsing frame in a position which is suitable for a particular size of extended film tube.

3. A method according to claim 1 wherein said collapsing frame assembly includes a pair of opposed main boards which are controlled as a pair by said board control system and a pair of opposed side boards which are controlled as a pair by said board control system.

4. A method according to claim 1 wherein said at least one board position transducer comprises at least one non-contact position sensor.

5. A method according to claim 4 wherein said at least one non-contact position sensor comprises at least one dual switch point ultrasonic proximity sensor.

6. A blown film extrusion apparatus, comprising:

(a) an annular die for extruding a film tube;

(b) at least one sensor located adjacent said extruded film tube for transmitting interrogating pulses to said extruded film tube and for producing a position signal corresponding to a detected position of said extruded film tube;

(c) a bubble position control system for receiving and processing said position signal;

(d) means for varying a quantity of air within said extruded film tube in response to said bubble position control system for urging said extruded film tube to a desired position, including a controllable valve, a supply blower, and an exhaust blower;

(e) a collapsing frame assembly for receiving said extruded film tube and collapsing said extruded film tube;

(f) said collapsing frame assembly including:
 (1) a plurality of frame boards;
 (2) at least one board position transducer for detecting the position of at least one of said plurality of frame boards;

(3) at least one board position actuator for adjusting the position of at least one of said plurality of frame boards;

(4) a board control system for receiving board position information from said at least one board position transducer and for providing control signals to said at least one board position actuator to maintain at least one of said plurality of frame boards in a predetermined position;

(g) wherein said bubble position control system and said board control system are configured to be concurrently operated during blown film extrusion operations in order to produce blown film product of uniform diameter by utilization of said board control system of said collapsing frame assembly to receive position signals from said at least one board position actuator and to actuate said at least one board position actuator to position said plurality of frame boards in order to track a specific diameter of the extruded film tube which is being produced.

7. A blown film extrusion apparatus according to claim 6 wherein said blown film extrusion apparatus includes an adjustable sizing cage which surrounds at least a portion of said extruded tube; and wherein said at least one sensor is coupled to said sizing cage and will move relative to said extruded tube with said adjustable sizing cage.

8. A blown film extrusion apparatus according to claim 6 wherein said blown film extrusion apparatus includes a processor; and wherein said bubble position control system includes instructions which are executed by said processor.

9. A blown film extrusion apparatus according to claim 6 wherein at least one sensor comprises a signal ultrasonic transducer.

10. A blown film extrusion apparatus according to claim 6 wherein said board control system maintains said collapsing frame in a position which is suitable for a particular size of extended film tube.

11. A blown film extrusion apparatus according to claim 6 wherein said collapsing frame assembly includes a pair of opposed main boards which are controlled as a pair by said board control system and a pair of opposed side boards which are controlled as a pair by said board control system.

12. A blown film extrusion apparatus according to claim 6 wherein said at least one board position transducer comprises at least one non-contact position sensor.

13. A blown film extrusion apparatus according to claim 12 wherein said at least one non-contact position sensor comprises at least one dual switch point ultrasonic proximity sensor.

* * * * *